United States Patent
Sawatsubashi et al.

(10) Patent No.: US 8,845,831 B2
(45) Date of Patent: Sep. 30, 2014

(54) HEAT TREATMENT METHOD

(75) Inventors: Seiichi Sawatsubashi, Tokyo (JP); Keiichi Kubo, Tokyo (JP)

(73) Assignee: Denki Kogyo Co., Ltd. (JP)

( * ) Notice: Subject to any disclaimer, the term of this patent is extended or adjusted under 35 U.S.C. 154(b) by 0 days.

(21) Appl. No.: 12/322,418

(22) Filed: Feb. 2, 2009

(65) Prior Publication Data

US 2010/0193091 A1 Aug. 5, 2010

(51) Int. Cl.

| | |
|---|---|
| *C21D 1/19* | (2006.01) |
| *C21D 1/63* | (2006.01) |
| *C21D 9/00* | (2006.01) |
| *C21D 6/00* | (2006.01) |
| *C21D 9/28* | (2006.01) |
| *C21D 1/42* | (2006.01) |
| *C21D 1/62* | (2006.01) |

(52) U.S. Cl.
CPC .. *C21D 1/19* (2013.01); *C21D 1/63* (2013.01); *C21D 9/0006* (2013.01); *C21D 6/00* (2013.01); *C21D 9/0062* (2013.01); *C21D 9/28* (2013.01); *C21D 2211/008* (2013.01); *C21D 1/42* (2013.01); *C21D 1/62* (2013.01)
USPC ........... 148/664; 148/660; 148/661; 148/662; 148/663

(58) Field of Classification Search
CPC ........................................................ C21D 1/19
USPC ................................................. 148/660–664
See application file for complete search history.

(56) References Cited

U.S. PATENT DOCUMENTS 3,111,436 A * 11/1963 McGavin ....................... 148/663
3,210,224 A * 10/1965 Argo ............................. 148/607
4,523,965 A *  6/1985 Lyman .......................... 148/578

FOREIGN PATENT DOCUMENTS

| JP | 61223130 A | 10/1986 |
|---|---|---|
| JP | 8134549 A | 5/1996 |
| JP | 09166156 A | 6/1997 |
| JP | 9194997 A | 7/1997 |
| JP | 9256105 A | 9/1997 |
| JP | 10204534 | 8/1998 |
| JP | 11080896 A | 3/1999 |
| JP | 11131180 A | 5/1999 |
| JP | 11140595 A | 5/1999 |
| JP | 11141656 A | 5/1999 |
| JP | 03-031415 B1 | 4/2000 |
| JP | 2001003118 A | 1/2001 |
| JP | 2001-115212 A | 4/2001 |

(Continued)

OTHER PUBLICATIONS

Office Action from Japanese Application No. 2006-282971 dated Aug. 2, 2011.

(Continued)

*Primary Examiner* — Brian Walck
(74) *Attorney, Agent, or Firm* — Lerner, David, Littenberg, Krumholz & Mentlik, LLP

(57) ABSTRACT

There is provided a heat treatment method in which high-quality tempering treatment can be performed in a short period of time. In this method, when an object to be treated is tempered after being quenched, the object to be treated is rapidly cooled to a 90% martensite transformation finishing temperature without being cooled to the ordinary temperature after quench heating, and then is subjected to 100% martensite transformation by using a 100° C. liquid, and thereafter, tempering treatment is performed after the whole of the object to be treated is soaked by using the 100° C. liquid.

6 Claims, 4 Drawing Sheets

(56) References Cited

FOREIGN PATENT DOCUMENTS

| JP | 2001-303134 | 10/2001 |
|---|---|---|
| JP | 2003268528 A | 9/2003 |
| JP | 2004-332089 A | 11/2004 |
| JP | 2005-336566 A | 12/2005 |

OTHER PUBLICATIONS

Japanese Office Action for Application No. 2006-282971 dated Dec. 26, 2012 (partial English translation).

Office action from Japanese Application No. 2006-282971 dated May 8, 2012.

* cited by examiner

HEAT TREATMENT METHOD

TECHNICAL FIELD

The present invention relates to a heat treatment method for heat-treating (for example, quenching and tempering) an object to be treated (for example, a steel part).

BACKGROUND ART

Conventionally, in the case where a steel part is heat-treated, a high frequency induction heating apparatus has been used. In tempering treatment after quenching treatment as well, the high frequency induction heating apparatus has often been used. As a publicly known technique of the high frequency induction heating apparatus, for example, Japanese Unexamined Patent Application Publication No. 2001-303134 is cited.

Conventionally, in the case where a steel part is quenched and tempered, a high frequency heat treatment apparatus 50, for example, shown in FIG. 3 is usually used. A process for performing heat treatment by using this high frequency heat treatment apparatus is as described below. First, in a quenching treatment section 2, an object 1 to be treated is heated to a required quenching temperature with a predetermined high frequency power for a predetermined period of time by using a quenching high frequency induction heating coil 3 connected to a quenching high frequency power source, not shown. Then, by spraying a quenching coolant 5 on the object 1 to be treated from a cooling means 4, the object 1 to be treated is rapidly cooled to a 90% martensite transformation finishing temperature (about 215° C., depending on the material properties of the object 1 to be treated). Hereunder, this rapid cooling process is referred to as a primary cooling process.

Thereafter, in a secondary cooling section 6 located at a position different from the position at which the primary cooling process is performed, the object 1 to be treated that has been subjected to 90% martensite transformation is sprayed with a quenching coolant 5 from a cooling means 7 so that the whole of the object 1 to be treated is cooled to the ordinary temperature for quench heating. Hereunder, this cooling process for performing soaking to the ordinary temperature is referred to as a secondary cooling process. The quenching coolants 5 sprayed in the primary and secondary cooling processes are an identical liquid (coolant) supplied from a common quenching coolant tank, not shown.

In an air blow section 8, by spraying compressed air 10 on the object 1 to be treated in a chamber 9, the quenching coolant 5 adhering to the surface of the object 1 to be treated that has cooled down to the ordinary temperature in the secondary cooling process is removed, and then, the object 1 to be treated is conveyed to a tempering treatment section 11 by using a conveying apparatus, not shown. Next, the object 1 to be treated is temper heated with predetermined high frequency power for a predetermined period of time by using a tempering high frequency induction heating coil 12 of the tempering treatment section 11, which is connected to a tempering high frequency power source, not shown. Then, the object 1 to be treated is air-cooled (let cool) for a required period of time on a cooling jig (a member for holing the object to be treated to let it cool) 13 arranged at a position separate from the position of the tempering high frequency induction heating coil 12, by which the quenching treatment and the tempering treatment are finished. Thus, for example, as shown in FIG. 4, a hardened layer S obtained by high frequency quenching treatment is formed in a hatched region of the outer peripheral surface of a columnar part α of an inner ring W of a hub unit, which is the object 1 to be treated. In FIG. 3, reference numerals 14, 15, 16 and 17 denote members for holding the object to be treated, which is used to hold the object 1 to be treated in a state of being placed at respective predetermined positions in the quenching treatment section (primary cooling section) 2, the secondary cooling section 6, the air blow section 8, and the tempering treatment section 11, respectively.

DISCLOSURE OF THE INVENTION

Problems to be Solved by the Invention

The reason why the whole of the object 1 to be treated is cooled to the ordinary temperature before temper heating is as described below. In the case where the object 1 to be treated is the inner ring W of the hub unit having the columnar part α and a flange part β, for example, as shown in FIG. 4, a small-diameter part 1*a*, a portion near the center of a large-diameter part 1*b*, and a region 1*c* ranging from the large-diameter part 1*b* to the flange part β each have a greatly different heat capacity. After quench heating has been performed and the primary cooling has finished, the inner ring W of the hub unit is formed with the quench hardened layer S indicated by hatching in FIG. 4. Considering that the amount of quench hardened layer S is the quantity of heat given to the object 1 to be treated during quench heating, the small-diameter part 1*a* has a low heat capacity because the formation amount of the quench hardened layer S is small and the diameter is small, so that the small-diameter part 1*a* is cooled sufficiently to a temperature close to the ordinary temperature at the stage of primary cooling. Also, the region 1*c* ranging from the large-diameter part 1*b* to the flange part β is also cooled to a temperature approximately close to the ordinary temperature by the primary cooling only because the formation amount of the quench hardened layer S is small and most of the flange part β is not subject to high frequency induction heating so that many ordinary-temperature portions remain. However, the large-diameter part 1*b* has a tendency for the temperature thereof to be less liable to be lowered by the primary cooling only as compared with other parts because the heat capacity thereof is high.

Therefore, a difference in temperature arises in one individual of the object 1 to be treated when only the primary cooling is performed. If quench heating is performed in the state in which the difference in temperature lies, the tendency of temperature distribution after quenching treatment is reflected, as it is, in the tendency thereof after tempering treatment, so that variations in hardness of the object 1 to be treated after tempering treatment increase. Describing in more detail, the temper hardness of the large-diameter part 1*b* decreases too much as compared with the small-diameter part 1*a* and the region 1*c* ranging from the large-diameter part 1*b* to the flange part β. Therefore, to decrease the variations in hardness after tempering treatment, the whole of the object 1 to be treated must be cooled to the ordinary temperature by the secondary cooling process. This is a reason why the whole of the object 1 to be treated is cooled to the ordinary temperature before temper heating.

It is also possible to cool the whole of the object 1 to be treated to the ordinary temperature in the primary cooling process only by omitting the secondary cooling process without providing the secondary cooling section 6. In this case, however, the time for primary cooling must be prolonged. Therefore, the residence time of the object 1 to be treated in the quenching treatment section 2 lengthens, which causes a trouble of lengthened cycle time (treatment time per one object to be treated).

Also, after the secondary cooling using the quenching coolant, the quenching coolant adheres to the surface of the object 1 to be treated. Therefore, unless the quenching coolant is removed by air blow, when water in the quenching coolant vaporizes at the time of temper heating in the next process, the heat of vaporization may partially hinder the temperature rise of the surface of the object to be treated. As a result, unevenness of temperature on the surface, that is, unevenness of temper hardness occurs. Therefore, air blow treatment in the air blow section 8 before temper heating is indispensable in the conventional heat treatment method.

Further, in the conventional tempering method, the object 1 to be treated must be heated from the ordinary temperature to the tempering temperature, so that some degree of long heating time is needed, which hinders the shortening of cycle time. Also, if an attempt is made to shorten the temper heating time by increasing the temper heating power, although the surface temperature of the object 1 to be treated rises, the temperature of the interior of the object 1 to be treated is less liable to rise because it is the ordinary temperature. Therefore, a trouble develops in that a fault in tempering occurs such that only the surface of the quench hardened layer S is tempered, or the hardness of the surface of the object 1 to be treated decreases too much.

The above phenomenon results from the fact that the penetration depth of high frequency current in steel at the magnetic transformation point or lower is approximately 1 mm or smaller, and when tempering treatment is performed by extremely rapid heating, only a portion near the surface of the object 1 to be treated is heated, and the interior thereof is not induction heated but is heated only by heat conduction from the surface, so that when the whole of the object 1 to be treated is at the ordinary temperature, the temperature rise in the interior due to the heat conduction from the surface is less, and a sudden temperature difference occurs between the surface and the interior.

The present invention has been made in view of the above circumstances, and accordingly an object thereof is to provide a heat treatment method in which high-quality tempering treatment can be performed in a short period of time.

Means for Solving the Problems

To achieve the above object, in a method in accordance with the present invention, when an object to be treated is tempered after being quenched, the object to be treated is rapidly cooled to a 90% martensite transformation finishing temperature (about 215° C., depending on the material properties of the object to be treated) without being cooled to the ordinary temperature after quench heating, and then is subjected to 100% martensite transformation (about 110° C., depending on the material properties of the object to be treated) by using a 100° C. liquid, and thereafter, tempering treatment is performed after the whole of the object to be treated is soaked by using the 100° C. liquid.

Also, in a method in accordance with the present invention, when an object to be treated is tempered after being quenched, the object to be treated is rapidly cooled to a 100% martensite transformation finishing temperature without being cooled to the ordinary temperature after quench heating, and then tempering treatment is performed after the whole of the object to be treated is soaked by using a 100° C. liquid.

Also, in the method in accordance with the present invention, the 100° C. liquid is water.

Also, in the method in accordance with the present invention, by using water as the 100° C. liquid, a process for removing the liquid adhering to the object to be treated before tempering treatment is omitted.

Advantages of the Invention

In the invention according to one embodiment, when the object to be treated is tempered after being quenched, the object to be treated is rapidly cooled to the 90% martensite transformation finishing temperature without being cooled to the ordinary temperature after quench heating, and then is subjected to 100% martensite transformation by using the 100° C. liquid, and thereafter, tempering treatment is performed after the whole of the object to be treated is soaked by using the 100° C. liquid. Therefore, the object to be treated immediately before tempering treatment is approximately kept at about 100° C. (a temperature far higher than the ordinary temperature, though a portion having a temperature lower than 100° C. is present depending on a place) including the interior thereof, so that the heating time can be shortened as compared with the case where temper heating is performed from the ordinary temperature. Also, since the interior of the object to be treated is also heated from a temperature close to about 100° C., a difference in temperature rise between the surface and the interior of the object to be treated is small. Therefore, not only the surface but also the interior is tempered sufficiently, so that high temper quality can be obtained.

Also, in one embodiment, when the object to be treated is tempered after being quenched, the object to be treated is rapidly cooled to the 100% martensite transformation finishing temperature without being cooled to the ordinary temperature after quench heating, and then tempering treatment is performed after the whole of the object to be treated is soaked by using the 100° C. liquid. Therefore, the object to be treated immediately before tempering treatment is approximately kept at about 100° C. (a temperature far higher than the ordinary temperature, though a portion having a temperature lower than 100° C. is present depending on a place) including the interior thereof, so that the heating time can be shortened as compared with the case where temper heating is performed from the ordinary temperature. Also, since the interior of the object to be treated is also heated from a temperature close to about 100° C., a difference in temperature rise between the surface and the interior of the object to be treated is small. Therefore, not only the surface but also the interior is tempered sufficiently, so that high temper quality can be obtained.

Also, in one embodiment, the 100° C. liquid is water. Therefore, the upper limit of temperature is 100oe, which offers an advantage that the control of temperature in a soaking tank can be carried out easily.

Also, in another embodiment, by using water as the 100° C. liquid, the process for removing the liquid adhering to the object to be treated before tempering treatment is omitted. Therefore, there is offered an advantage that by using water as the 100° C. liquid, 100° C. water on the surface of the object to be treated is vaporized immediately before the object to be treated is tempered, so that the process for removing water is unnecessary, and therefore the heat treatment facility can be configured so as to be compact.

BEST MODE FOR CARRYING OUT THE INVENTION

Figure 3:
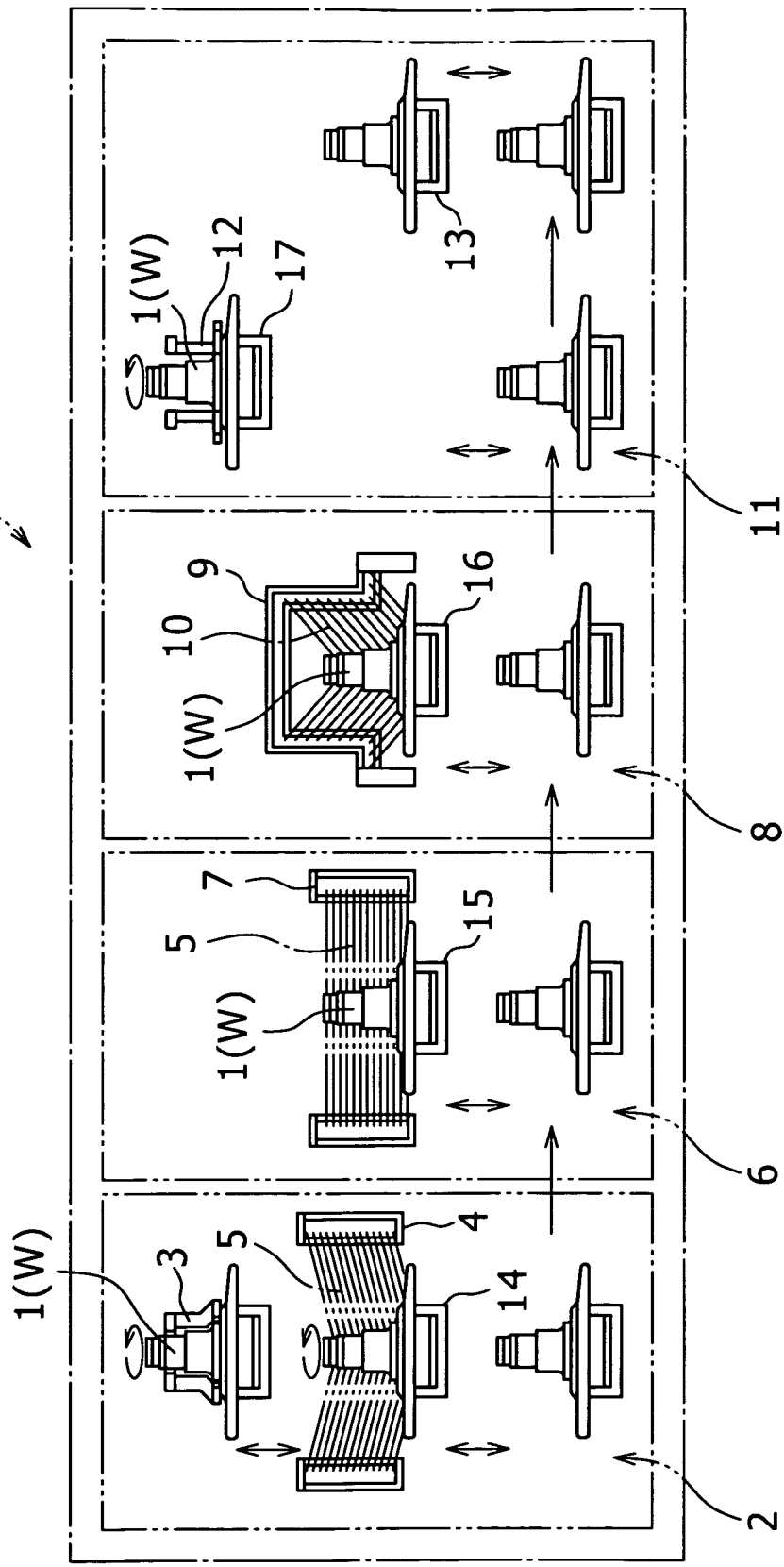
FIG. 3 is a schematic view of a heat treatment apparatus for carrying out a conventional heat treatment method.
Figure 4:
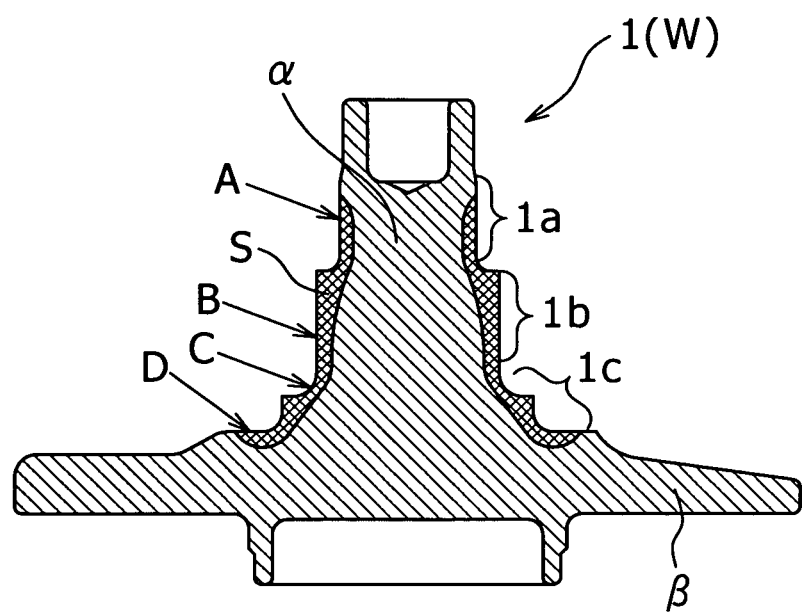
FIG. 4 is a sectional view of an inner ring of a hub unit, which is an object to be treated.

A heat treatment method in accordance with one embodiment of the present invention will now be described with reference to FIGS. 1, 2 and 4. In these figures, the same symbols are applied to elements similar to those shown in FIGS. 3 and 4, and the duplicated explanation is omitted.

Figure 1:
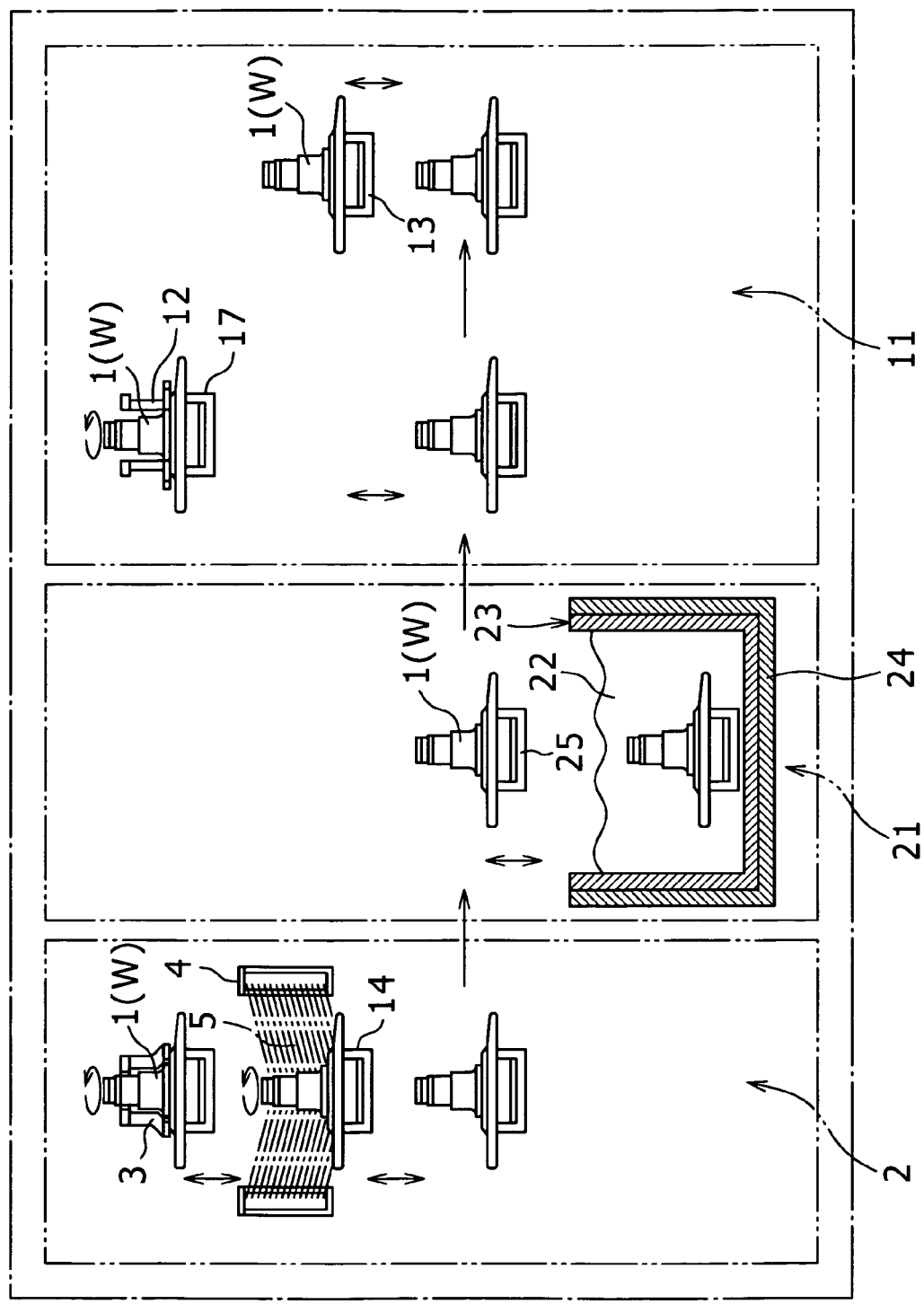
FIG. 1 is a schematic view of a heat treatment apparatus for carrying out a heat treatment method in accordance with one embodiment of the present invention.

FIG. 1 shows a heat treatment apparatus 20 used for carrying out the heat treatment method in accordance with the present invention. The apparatus 20, which is used, for example, to quench and temper an object 1 to be treated, includes a quenching treatment section 2, a soaking section 21, a tempering treatment section 11, and a conveying mechanism (not shown) for conveying the object 1 to be treated from the quenching treatment section 2 to the soaking section 21 and from the soaking section 21 to the tempering treatment section 11. In this embodiment, the quenching treatment section 2, the soaking section 21, and the tempering treatment section 11 are, for example, arranged sideways, and as the object 1 to be treated, for example, an inner ring W of a hub unit, which is one kind of steel part, is used.

First, the aforementioned quenching treatment section 2 includes a quenching high frequency induction heating coil 3 connected to a quenching high frequency power source, not shown, to quench heat the inner ring W of the hub unit, which is the object 1 to be treated, a cooling means 4 for rapidly cooling the object 1 to be treated (the inner ring W of the hub unit), which has been heated to a required quenching temperature, to a 90% martensite transformation finishing temperature, a rotating/elevating mechanism (not shown) for rotating and elevating the object 1 to be treated by holding it, and a holding member 14 for holding the object to be treated (the object to be quenched) that is fixed to the rotating/elevating mechanism.

Also, the aforementioned soaking section 21 includes a soaking tank 23 for storing a 100° C. liquid (for example, water) 22 used as a medium for subjecting the object 1 to be treated, which has been rapidly cooled to the 90% martensite transformation finishing temperature, to 100% martensite transformation, and for soaking the whole of the object 1 to be treated, an insulating material 24 for covering the soaking tank 23 to prevent heat dissipation of the liquid (for example, water) 22, a heater and a temperature sensor, not shown, used for always keeping the temperature of the liquid 22 at 100° C., an elevating mechanism (not shown) for putting and taking the object 1 to be treated into and out of the soaking tank 23, and a holding member 25 for holding the object to be treated that is fixed to the elevating mechanism.

Also, the aforementioned tempering treatment section 11 includes a tempering high frequency induction heating coil 12 connected to a tempering high frequency power source, not shown, to temper heat the object 1 to be treated, a rotating/elevating mechanism (not shown) for rotating and elevating the object 1 to be treated by holding it, a holding member 17 for holding the object to be treated (the object to be tempered) that is fixed to the rotating/elevating mechanism, a conveying mechanism (not shown) for conveying the object 1 to be treated to an air cooling position after temper heating, and a holding jig (a member for holing the object to be treated to let it cool) 13 for holding the object 1 to be treated at the air cooling position.

Next, a process in which the object 1 to be treated is heat treated by using the heat treatment apparatus 20 configured as described above is described below in detail. In this case, as the object 1 to be treated, the inner ring W of the hub unit shown in FIG. 4 is used. Also, the arrow marks in FIG. 1 indicate the transfer direction of the inner ring W of the hub unit, which is the object 1 to be treated, and the holding members 14, 25 and 17.

First, the inner ring W of the hub unit is placed on the holding member 14 for holding the object to be treated (the object to be quenched) in the quenching treatment section 2, and the inner ring W of the hub unit is arranged at a predetermined position in the quenching high frequency induction heating coil 3 by the rotating/elevating mechanism, not shown. Next, the inner ring W of the hub unit is rotated around the axis line thereof via the holding member 14 by the rotating/elevating mechanism, not shown, and then the surface of the inner ring W of the hub unit is heated to a required quenching temperature by supplying predetermined high frequency power to the quenching high frequency induction heating coil 3 from the quenching high frequency power source, not shown, for required period of time. Thereafter, a primary cooling process is performed as described below. The inner ring W of the hub unit is lowered to a predetermined position in the cooling means 4 by the rotating/elevating mechanism (not shown), and a quenching coolant 5 is sprayed on the surface of the inner ring W of the hub unit from the cooling means 4, by which the object 1 to be treated is rapidly cooled to the 90% martensite transformation finishing temperature after quench heating without being cooled to the ordinary temperature. After the primary cooling process is finished, the inner ring W of the hub unit is conveyed to the soaking section 21 by the conveying apparatus, not shown.

In the soaking section 21, the inner ring W of the hub unit is placed on the holding member 25, and is immersed in the liquid 22 in the soaking tank 23 by the elevating mechanism, not shown. After predetermined time has elapsed (depending on the material, mass, shape, and the like of the inner ring W, after 15 seconds has elapsed), the inner ring W of the hub unit is pulled up to the outside of the soaking tank 23. During the immersion for the predetermined period of time, a quench hardened layer S (refer to FIG. 4) of the inner ring W of the hub unit is subjected to 100% martensite transformation by the liquid 22 that is stored in the soaking tank 23 and always held at 100° C. (the surface temperature of the inner ring W at this time is lower than a 100% martensite transformation finishing temperature and not lower than 100° C.). Further, the whole of the inner ring W of the hub unit becomes in a state of being soaked approximately to about 100° C. (a temperature far higher than the ordinary temperature, though a portion having a temperature lower than 100° C. is present depending on a place).

Next, the inner ring W of the hub unit the whole of which has been soaked approximately to about 100° C. by the soaking section 21 is conveyed to the tempering treatment section 11 by the conveying apparatus, not shown, and is placed on the holding member 17 for holding the object to be treated (the object to be tempered). In the tempering treatment section 11, the inner ring W of the hub unit is arranged at a predetermined position in the tempering high frequency induction heating coil 12 by the rotating/elevating mechanism, not shown. Then, after the inner ring W of the hub unit is rotated via the holding member 17 by the rotating/elevating mechanism (not shown), the surface of the inner ring W of the hub unit is heated to a required tempering temperature by supplying required high frequency power to the tempering high frequency induction heating coil 12 from the tempering high frequency power source, not shown, for required period of time. Thereafter, the inner ring W of the hub unit having been temper heated is conveyed to an air cooling position by the conveying apparatus (not shown) in the tempering treatment section 11, and is placed on the air cooling jig (the member for holing the object to be treated to let it cool) 13. After the inner ring W of the hub unit is let to cool for a predetermined period of time, the whole thereof is cooled to the ordinary temperature by a water cooling means, not shown, by which the quenching and tempering process of the inner ring W of the hub unit performed by this apparatus 20 is finished.

Since the whole of the inner ring W of the hub unit, which is the object 1 to be treated, is soaked approximately to about 100° C. in the soaking section 21 of the heat treatment apparatus 20 as described above before the temper heating, as shown in FIG. 2, although the conventional temper heating has taken 15 seconds, in the present invention, the temper heating finishes in 9 seconds, and it is also found that the highest surface temperature in the present invention is about 40° C. lower than that in the conventional example. Also, from Table 1, it is confirmed that comparing the surface hardnesses after tempering, there is no difference in surface hardness in portions between the present invention and the conventional example. Table 1 compares the surface hardnesses of the inner ring W after tempering treatment in the case where the heat treatment method of the present invention and the conventional heat treatment method are applied to the inner ring W of the hub unit.

TABLE 1

|  | Distance from top surface | Hardness measurement value (Vickers hardness) | | | | Mean value of surface | Max. value of surface | Min. value of surface | Max. value − |
| --- | --- | --- | --- | --- | --- | --- | --- | --- | --- |
|  | (mm) | A | B | C | D | hardness | hardness | hardness | min. value |
| Hardness after | 0.25 | 730 | 719 | 722 | 738 | 727 | 738 | 719 | 19 |
| tempering | 0.50 | 725 | 704 | 713 | 740 | | | | |
| obtained by apparatus | 0.75 | 716 | 711 | 719 | 729 | | | | |
| of present Invention | 1.00 | 724 | 700 | 708 | 730 | | | | |
| Difference between hardness at position 0.25 mm deep from top surface and hardness at position 1.00 mm deep therefrom | | 6 | 19 | 14 | 8 | | | | |
| Hardness after | 0.25 | 724 | 700 | 734 | 731 | 722 | 734 | 700 | 34 |
| tempering | 0.50 | 728 | 703 | 721 | 734 | | | | |
| obtained by | 0.75 | 735 | 702 | 724 | 735 | | | | |
| conventional | 1.00 | 730 | 704 | 716 | 744 | | | | |
| apparatus | | | | | | | | | |
| Difference between hardness at position 0.25 mm deep from top surface and hardness at position 1.00 mm deep therefrom | | −6 | −4 | 18 | −13 | | | | |

Figure 2:
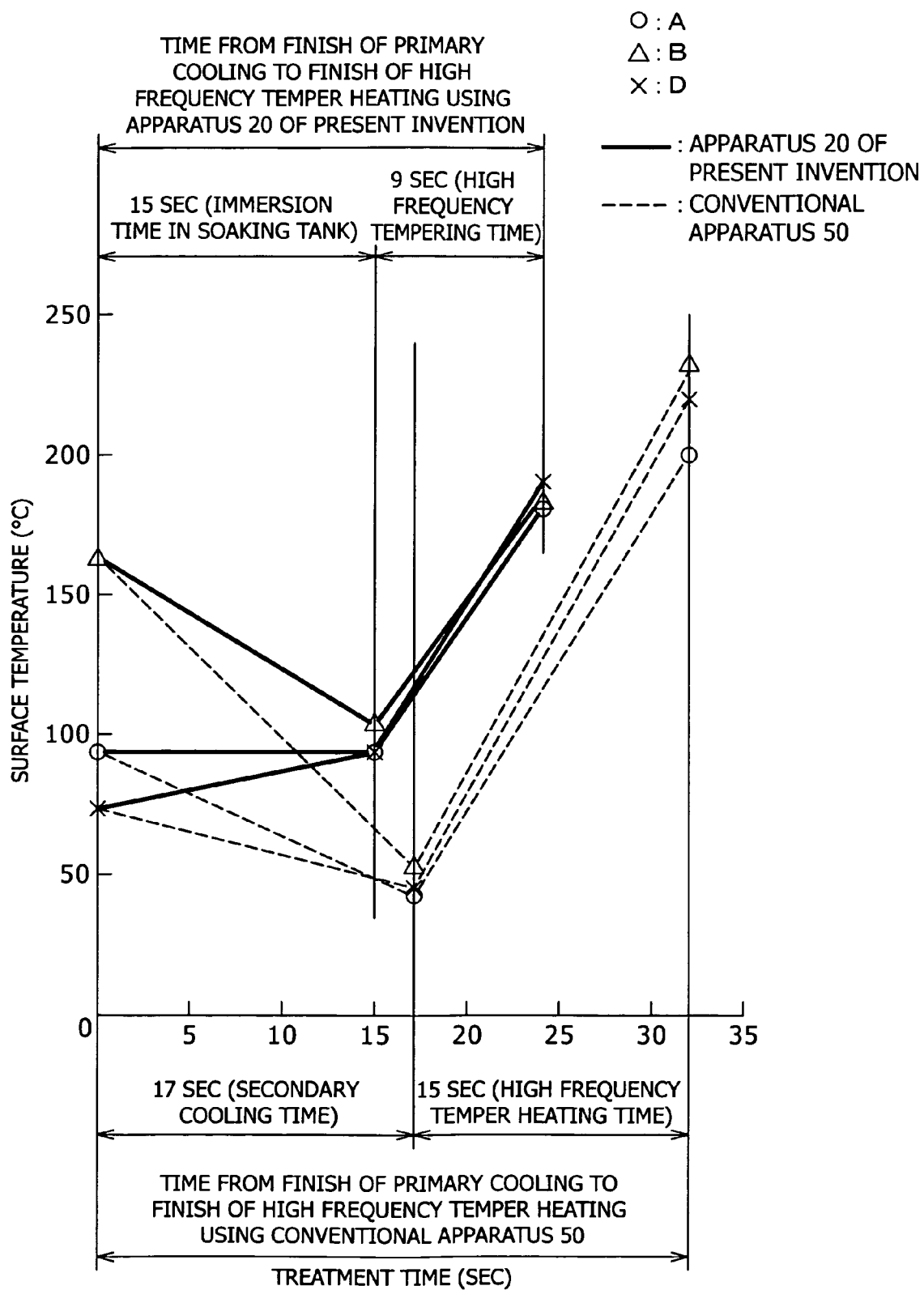
FIG. 2 is a graph showing the relationship between surface temperature in portions of an inner ring of a hub unit, which is an object to be treated, and treatment time from the finish of primary cooling to the finish of temper heating in a heat treatment method of the present invention and a conventional heat treatment method.

FIG. 2 is a graph in which temperature changes from immediately after the finish of primary cooling to the finish of temper heating are compared in the case where the inner ring W of the hub unit is quenched and tempered by using the heat treatment apparatus 20 of the present invention and a conventional heat treatment apparatus 50 when the temper heating power is 18 kW (constant). The broken lines in FIG. 2 indicate temperature changes in the case where the conventional heat treatment apparatus 50 is used, and the solid lines indicate temperature changes in the case where the heat treatment apparatus 20 of the present invention is used. The temperature measurement positions A, B and D correspond to symbols A, B and D applied to the cross section of the inner ring W of the hub unit shown in FIG. 4. For the apparatus 20 of the present invention, the time axis (axis of abscissa) of graph does not include conveyance time from the soaking section 21 to the tempering treatment section 11, and for the conventional apparatus 50, the time axis does not include conveyance time from a secondary cooling section 6 to an air blow section 8, time for air blow in the air blow section 8, and conveyance time from the air blow section 8 to the tempering treatment section 11. On the other hand, Table 1 given below compares the surface hardnesses of the inner ring W of the hub unit in the case where the inner ring W of the hub unit is treated by the apparatus 20 of the present invention and the conventional apparatus 50.

In the primary cooling process after quench heating, the object 1 to be treated is sometimes cooled to the 100% martensite transformation finishing temperature. This differs according to the material, shape, and mass of the object to be treated. In this case, in the quenching treatment section 2, the object 1 to be treated is rapidly cooled to the 100% martensite transformation finishing temperature without being cooled to the ordinary temperature after quench heating, and thereafter in the soaking section 21, the whole of the object 1 to be treated is soaked by the 100° C. liquid 22, and then the object 1 to be treated is tempered in the tempering treatment section 11.

The heat treatment method of this embodiment in which the object 1 to be treated is soaked ideally to about 100° C. before tempering treatment by using the 100° C. liquid 22 as described above can achieve the following effects:

(1) The temper heating time for tempering treatment can be shortened.
(2) Since the whole of the object to be treated before tempering treatment has been soaked to about 100° C., when temper heating is performed by high frequency induction heating, the temperature difference between portions of the object to be treated immediately after the finish of heating is small.
(3) Even in high frequency induction tempering, there is little tendency for the internal hardness of the object to be treated to be higher than the surface hardness thereof.

(4) Because of the above items (1) and (2), high-quality tempering treatment can be performed.

(5) Since 100° C. water is used as a liquid for soaking the object to be treated to about 100° C., the upper limits of the soaking temperature of the object to be treated and the liquid temperature are 100° C., so that the control of temperature can be carried out easily.

(6) In the state in which the object to be treated is soaked approximately to about 100° C., 100° C. water adhering to the surface of the object to be treated vaporizes rapidly, so that an air blow process before the tempering treatment can be omitted, and therefore the heat treatment apparatus can be made compact.

Thus, according to the heat treatment method of this embodiment, the cycle time (treatment time per one object to be treated) can be shortened while improving the temper quality. Further, since the air blow section 8 (refer to FIG. 3) before tempering treatment can be omitted, the heat treatment apparatus can be made compact (small in size).

The above is a description of one embodiment of the present invention. The present invention is not limited to the above-described embodiment, and various modifications and changes can be made based on the technical concept of the present invention. In the above-described embodiment, the method involves quenching treatment and tempering treatment performed successively and continuously. However, the present invention can also be applied to a tempering apparatus in which tempering treatment is performed after quenching treatment has been finished in a separate process. Also, in the above-described embodiment, the liquid 22 used in the soaking section 21 is 100° C. fresh water. However, water to which a water-soluble rust preventive or the like is added may be used. Alternatively, in place of 100° C. water, various kinds of other liquids may be used. Also, in the above-described embodiment, the object 1 to be treated is the inner ring W of the hub unit. However, the object 1 to be treated is not limited to this. The present invention can be applied to various parts such as a constant velocity joint and a crankshaft.

The invention claimed is:

1. A heat treatment method for quench hardening an object to be tempered, comprising:

heating said object to a quenching temperature of said object;

rapidly cooling said object to a 90% martensite transformation finishing temperature by first spray cooling said object with a quenchant having a temperature below 100° C., without cooling said object to an ordinary temperature after quench heating;

immersing the entire object in a 100° C. liquid to cool the object to a substantially uniform temperature of about 100° C. thereby cooling said object to 100% martensite transformation finishing temperature; and tempering the surface of said object after transforming said object to 100% martensite transformation finishing temperature, wherein the object is kept at a temperature of about 100° C. immediately before tempering, and wherein a process for removing the liquid adhering to the object before the tempering treatment is omitted.

2. The heat treatment method for quench hardening an object according to claim 1, wherein the liquid is water.

3. The heat treatment method for quench hardening an object according to claim 1, further comprising air cooling said object after tempering the surface of said object.

4. The heat treatment method for quench hardening an object according to claim 3, further comprising water cooling said object after air cooling said object.

5. A heat treatment method for quench hardening an object to be tempered that has been heated to a quenching temperature of said object, comprising:

rapidly cooling said object directly to a 90% martensite transformation finishing temperature by first spray cooling said object with a quenchant having a temperature below 100° C., and thereafter, without cooling said object to an ordinary temperature immersing said object in a 100° C. liquid to finish cooling to 100% martensite transformation finishing temperature and to form a quench hardened layer area on the surface of the object; and thereafter tempering the quench hardened layer area formed on the surface of said object that has been soaked to about 100° C., wherein a process for removing the liquid adhering to the object before the tempering treatment is omitted.

6. The heat treatment method for quench hardening an object according to claim 5, wherein the liquid is water.

* * * * *